No. 784,925. PATENTED MAR. 14, 1905.
C. M. CRAWFORD.
PROCESS OF CONSTRUCTING WATER TIGHT MASONRY WALLS.
APPLICATION FILED OCT. 12, 1904.

Witnesses:
Horace S. Howe.
Cora A. Stine.

Inventor:
Charles M. Crawford
By his Attorney.
Frank G. Campbell

No. 784,925.

Patented March 14, 1905.

UNITED STATES PATENT OFFICE.

CHARLES M. CRAWFORD, OF HARTFORD, CONNECTICUT.

PROCESS OF CONSTRUCTING WATER-TIGHT MASONRY WALLS.

SPECIFICATION forming part of Letters Patent No. 784,925, dated March 14, 1905.

Application filed October 12, 1904. Serial No. 228,166.

*To all whom it may concern:*

Be it known that I, CHARLES M. CRAWFORD, a citizen of the United States, residing at Hartford, in the county of Hartford and State of Connecticut, have invented certain new and useful Improvements in Processes of Constructing Water-Tight Masonry Walls, of which the following is a specification.

My invention relates to a process of constructing masonry walls, floors, dams, and the like, and has for its object the provision of means for forming recesses between the blocks of cement or other artificial masonry forming said walls adapted to receive a plastic material, and thereby provide a water-tight joint at the junction of said blocks.

Further objects and advantages of my invention will be set forth in the detailed description which now follows.

Figure 1:
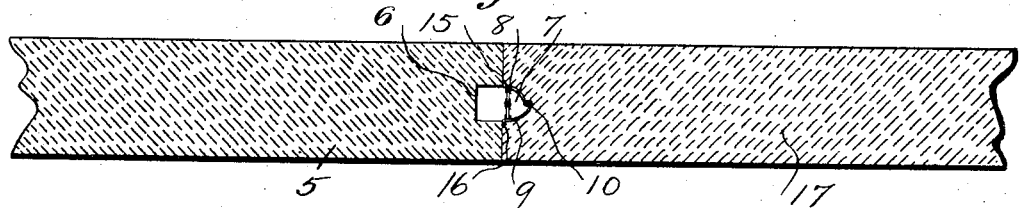
Figure 2:
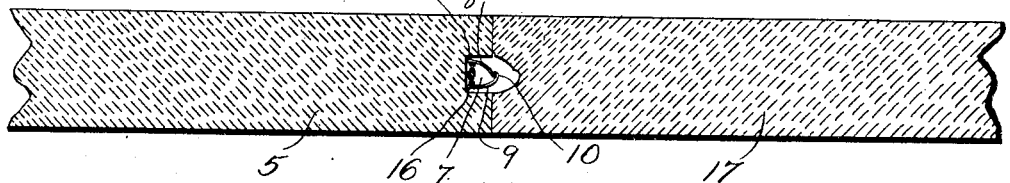
Figure 3:
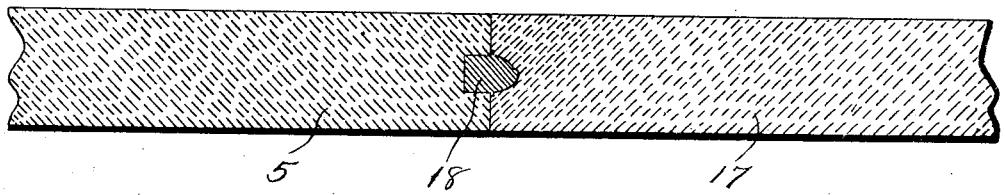
Figure 4:
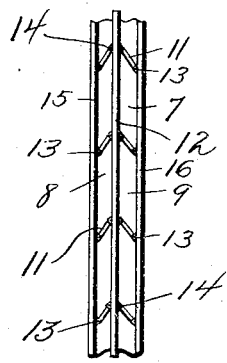
Figure 5:
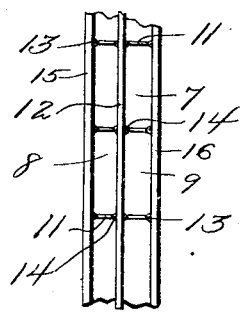

In the accompanying drawings, Figure 1 is a horizontal section taken through two blocks of cement, showing a collapsible trough, hereinafter described, in position. Fig. 2 is a view similar to Fig. 1, showing said trough collapsed and ready to be removed. Fig. 3 is a view similar to the two preceding views, showing the collapsible trough removed and the recesses filled with a plastic material. Fig. 4 is an elevation of the trough with its sides collapsed. Fig. 5 is a similar view with the sides of the trough extended.

Like numerals designate similar parts in all of the figures of the drawings.

In constructing a wall or dam in accordance with this invention the block 5 of cement is first formed by inserting a stick of wood, such as a piece of scantling, in position before the cement is placed in the mold or form. After the cement hardens this piece of wood is removed, leaving a recess 6, such as illustrated.

The collapsible trough 7 comprises walls 8 and 9, hinged together at 10 and capable of being drawn together or forced apart by the links 11 and rod 12, said links being hinged at 13 to the walls of the trough and at 14 to the rod 12 or other connecting member, whereby when said rod is drawn up, as shown in Fig. 4, the walls of the trough will be collapsed to permit the ready withdrawal of said trough, as will be hereinafter described.

After the recess 6 has been formed in the cement block 5 the above-described trough is placed in position with flanges 15 and 16 resting against the face of the said block adjacent to the edges of recess 6. The cement forming the second block 17 is then placed in the mold or form, the trough 7 preventing the said cement from filling the recess 6 when this is done. After the cement hardens the trough 7 is collapsed and withdrawn. The recess which remains is then filled with some suitable plastic material 18 (see Fig. 3) of such consistency as to effectually resist the pressure of water when the fissures between the blocks of cement widen as said blocks contract and to give to permit said fissures to close when said blocks expand.

A way has long been sought of constructing cement or concrete walls, floors, dams, and the like with the joints thereof filled with a plastic material, and from the foregoing description it will be seen that simple and efficient means are herein provided for accomplishing this object. By providing the collapsible trough the cement forming the second block is prevented from entering the recess formed in the first block until said cement hardens, while rendering it possible to remove said trough after said cement hardens and the recess is ready to receive the plastic filling material.

It is to be understood that I do not limit myself to the use of the specific collapsible trough herein shown and described, for any form of collapsible trough or its equivalent may be substituted therefor, if desired. Neither do I limit myself to any specific material for forming the blocks comprising the masonry structure, for any form of concrete or artificial stone may be used.

Having described my invention, what I claim is—

1. A process of constructing water-tight joints in masonry which consists of interposing a collapsible trough or its equivalent between a recessed block forming part of said masonry and the cement which forms the adjacent block until said cement hardens, and in then removing said collapsible trough and filling the recesses in the blocks with a plastic material.

2. A process of constructing water-tight joints in masonry which consists of forming a recessed block of cement, concrete or some analogous material and so placing a collapsible trough or its equivalent that the cement forming the adjacent block will be prevented from filling said recess until the cement hardens, and in then removing said collapsible trough and filling the remaining recesses with a plastic material.

3. A process of constructing water-tight joints in masonry which consists of interposing a mold between a recessed monolith and the cement which forms the adjacent monolith, until said cement hardens and in then removing said mold and filling the recess with a plastic material.

4. A process of constructing water-tight joints in masonry which consists of interposing a collapsible mold between the cement blocks forming said masonry until said cement hardens and in then removing said mold and filling the recess or passage left by the withdrawal of the mold with a plastic material.

In testimony whereof I affix my signature in presence of two witnesses.

CHARLES M. CRAWFORD.

Witnesses:
JOSIAH H. PECK,
NORMAN McD. CRAWFORD.